US006182952B1

(12) United States Patent
Gutierrez

(10) Patent No.: US 6,182,952 B1
(45) Date of Patent: Feb. 6, 2001

(54) ACUATOR FOR A TRUNK-COVER, A HOOD, A DOOR, A REAR DOOR OF VEHICLES, ESPECIALLY OF AUTOMOBILES

(75) Inventor: Carmelo Gutierrez, Ehringshausen-Katzenfurt (DE)

(73) Assignee: Kuster & Co. GmbH (GB)

( * ) Notice: Under 35 U.S.C. 154(b), the term of this patent shall be extended for 0 days.

(21) Appl. No.: 09/210,576

(22) Filed: Dec. 14, 1998

(30) Foreign Application Priority Data

Dec. 13, 1997 (DE) .......................................... 197 55 486.6

(51) Int. Cl.[7] ........................................................ F16F 5/00

(52) U.S. Cl. ......................... 267/64.11; 267/120; 49/260; 49/248

(58) Field of Search .................................... 267/174, 175, 267/177, 16, 120, 121, 64.11; 49/246, 248, 260

(56) References Cited

U.S. PATENT DOCUMENTS 4,623,132 * 11/1986 Smith .................................... 267/34
4,833,826 * 5/1989 Viard ...................................... 49/246
5,095,654 * 3/1992 Eccleston ................................ 49/280
5,865,497 * 2/1999 Klein et al. ........................ 296/146.8

FOREIGN PATENT DOCUMENTS 297 01 617 U1 5/1997 (DE) .

* cited by examiner

*Primary Examiner*—Christopher P. Schwartz
*Assistant Examiner*—Devon Kramer
(74) *Attorney, Agent, or Firm*—Liniak, Berenato, Longacre & White

(57) ABSTRACT

A drive system for trunk doors, engine hoods, hatchbacks (12), doors or the like of vehicles in particular motor vehicles comprising at least one hinge (1, 2, 3, 4) and a power spring, for instance a pneumatic spring (5) assisting the opening motion. The invention provides a mechanism shifting the direction of action of the pneumatic spring (5) to attain rapid, automatic opening of the hatchback (12) following its unlocking.

13 Claims, 8 Drawing Sheets

Figure 1:
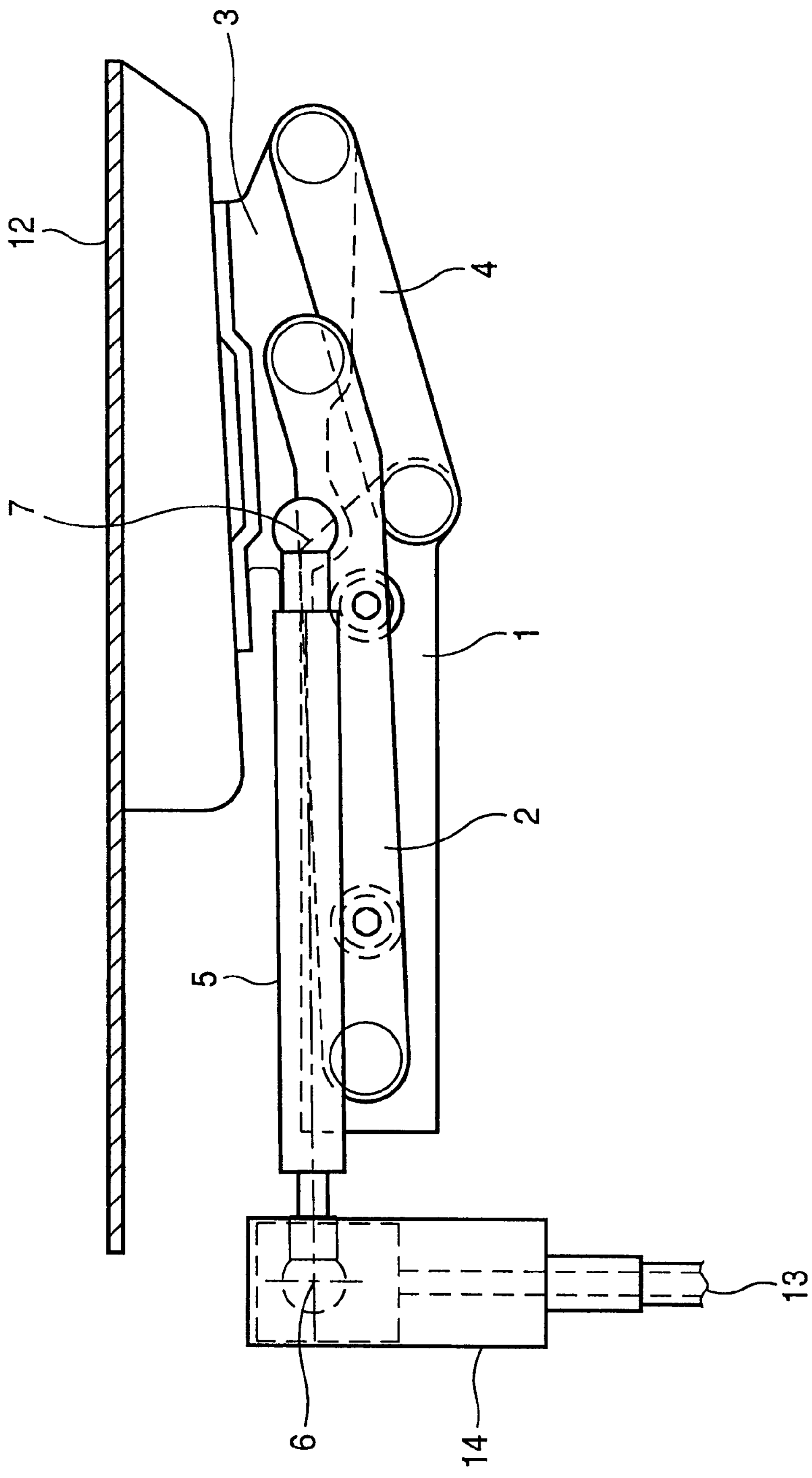

ACUATOR FOR A TRUNK-COVER, A HOOD, A DOOR, A REAR DOOR OF VEHICLES, ESPECIALLY OF AUTOMOBILES

The invention relates to a system driving trunk doors, engine hoods, doors, hatchbacks or the like of vehicles, in particular motor vehicles.

Frequently articulating drives, for instance four-link hinges are used to open motor vehicle hatchbacks, a pneumatic spring most of the time assisting the opening motion. However when the hatchback is in the closed state, the operative direction of the pneumatic spring toward the four-link hinge is so disadvantageous that the torque is insufficient, even after unlocking, to lift the hatchback. Accordingly the trunk door must be manually opened by about 40° until the pneumatic spring has reached a lever position wherein its force is sufficient to fully open the hatchback.

The German patent document U1 297 01 617 discloses a drive system to actuate a hatchback comprising a motor drive displacing a drive cable guided at least over some zones and engaging a lever arm of the articulating drive means. After the lock has been loosened, the lever arm is pivoted by the motor drive and the hatchback is opened in this manner. Manual opening is no longer required. Now it was found that there is room for improvement in this known system, in particular as regards the opening sequence.

It is therefore the objective of the invention to create a trunk-door drive system which upon unlocking implements automatic opening of the trunk door or hatchback, the opening displacement taking place rapidly.

This problem is solved by the invention by a mechanism adjusting the direction of action of the power spring (the pneumatic spring). This adjustment takes place in particular in the closed state of the hood or immediately after unlocking, and displaces the pneumatic spring to move it into a position such that following unlocking it can open the hood on its own. This displacement of the invention exploits the energy stored in the pneumatic spring, resulting in rapidly opening the hood or hatchback.

Preferably the mechanism is of such a design that it shifts a connection point, in particular the body-side connection point of the power spring (the pneumatic spring). This shifting of the connection point of the power spring may be for instance an up-and-down motion or a sideways one. The invention only requires that a force component shall be created to open the hatchback or the trunk door. In the invention therefore, the body-side connection point of the power spring is displaced from an initial position into an operative one, and thereby a force component is produced to open the hatchback and to overcome the dead point. In the closed condition or directly at opening, the connection point of the power spring is displaced spatially in such manner that a force component (a torque) is produced in the opening direction at the hatchback.

The following operational play was found especially advantageous in the invention. Starting from the closed position of the hatchback and power spring, the latter in this closed position running substantially parallel to the lever arm, there occurs first a downward displacement of the connection point until the power spring has overcome the dead point and the hatchback will be self-opening. Thereafter, possibly still within the stage of opening, the connection point is returned into its initial position in order to produce in this way maximum force from the power spring to open the hatchback. Furthermore the mechanism then shall be ready for a new operation.

The said up-and-down displacement of the connection point or another spatial displacement of the power spring illustratively may be implemented using a cam drive shifting the connection points of the power spring(s) into the desired operative position(s). The motor drive may act on one or two pneumatic springs depending on how many are used to lift the hatchback. In particular the motor drive may actuate a cam connected to two push-pull cables which synchronously shift the connection points of the two power springs.

The connection point of the power spring may just as well be located on a cam disk for instance resting on the body side and being rotated by the motor drive. This design applies both to using one power spring and two, in the latter case obviously two cam disks being used.

In another embodiment of the invention, the hatchback is self-closing for instance because the power spring is relaxed in the open position. This feature also can be implemented by shifting the direction of action or the direction of the connection point (preferably at the body side) of the power spring, whereby the hatchback moves into the closed position on account of its own weight. Equally feasible, the closing motion will be motor-assisted. The mechanism returns into its initial position after hatchback-closing, ie, the pneumatic spring is restressed.

Further advantages, goals, features and applicabilities of the present invention are elucidated in the following description of embodiments in relation to the drawings. All described and/or graphically shown features are objectives of the invention, whether per se or in arbitrary combination (s), also regardless of their abstracted form in the claims or in any interrelationship among theses claims.

Figure 2:
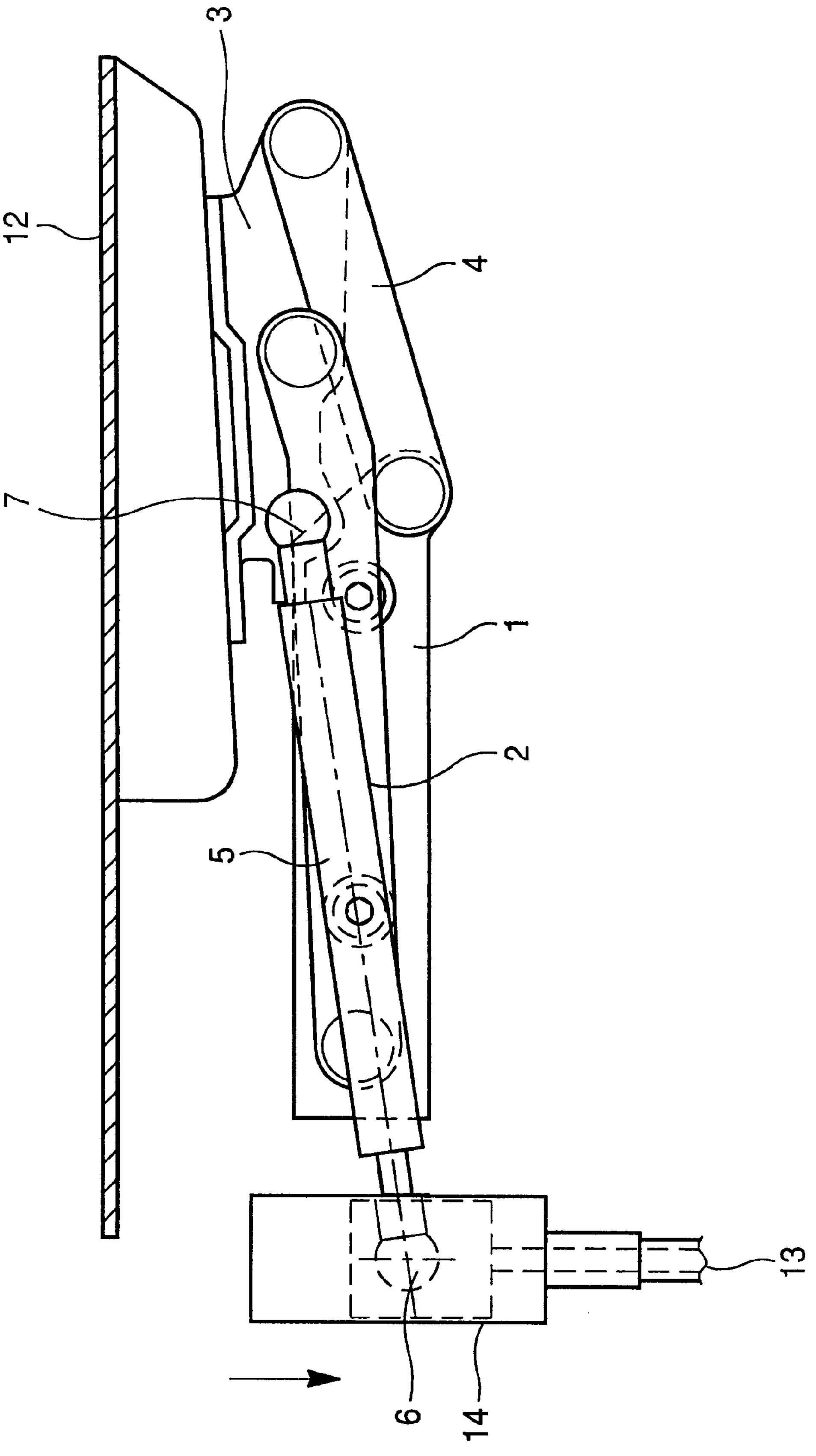
Figure 3:
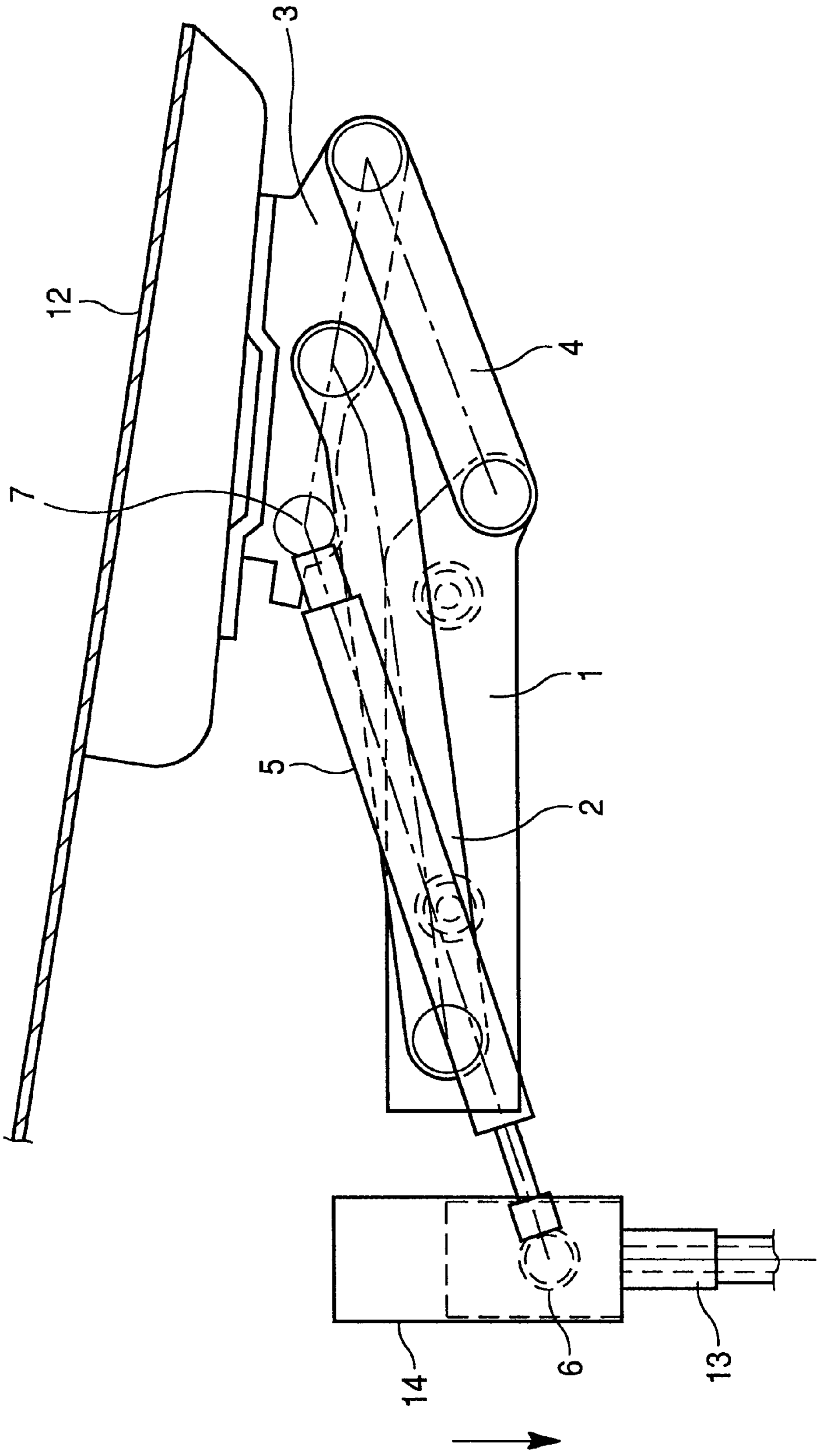
Figure 4:
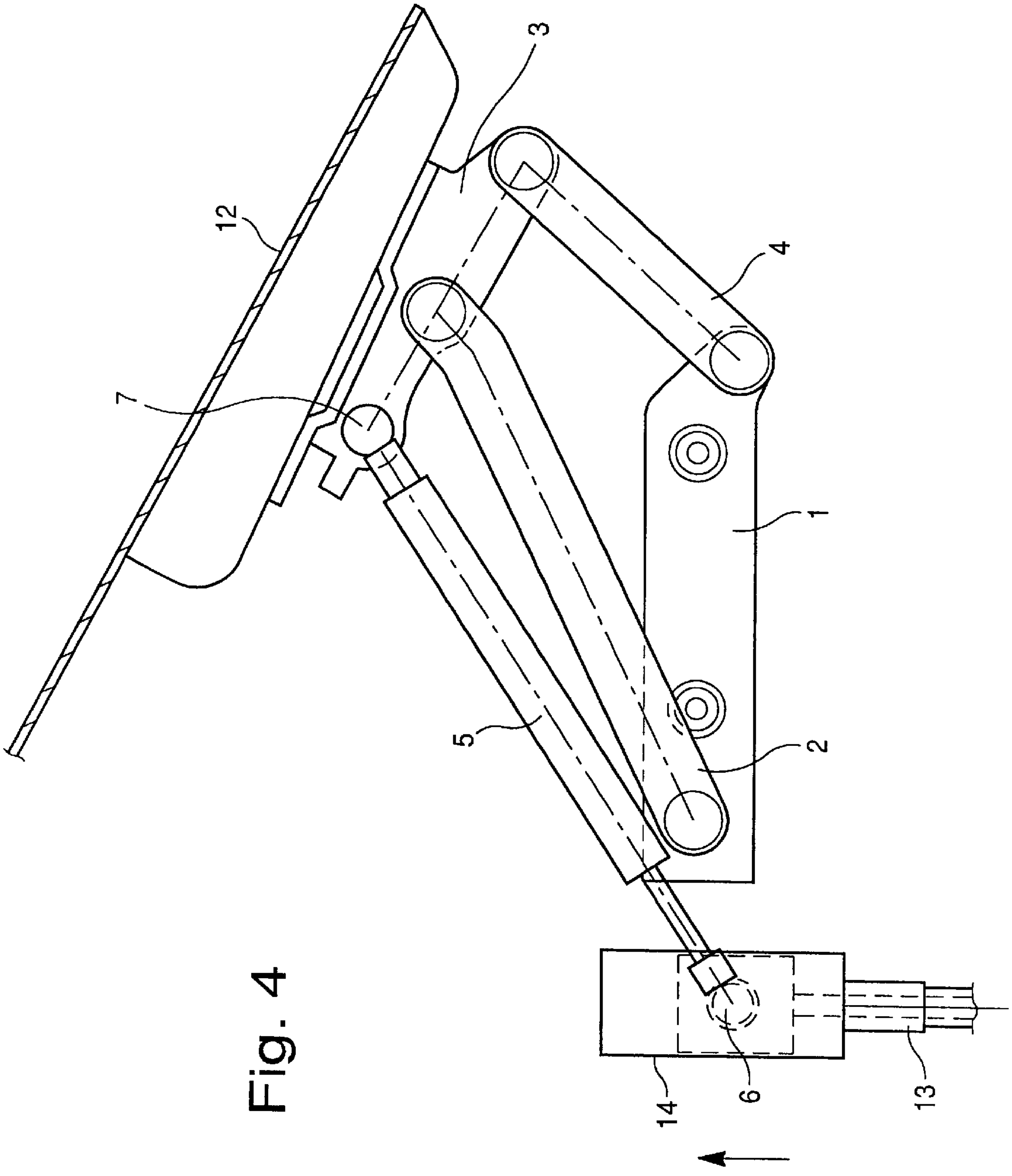
Figure 5:
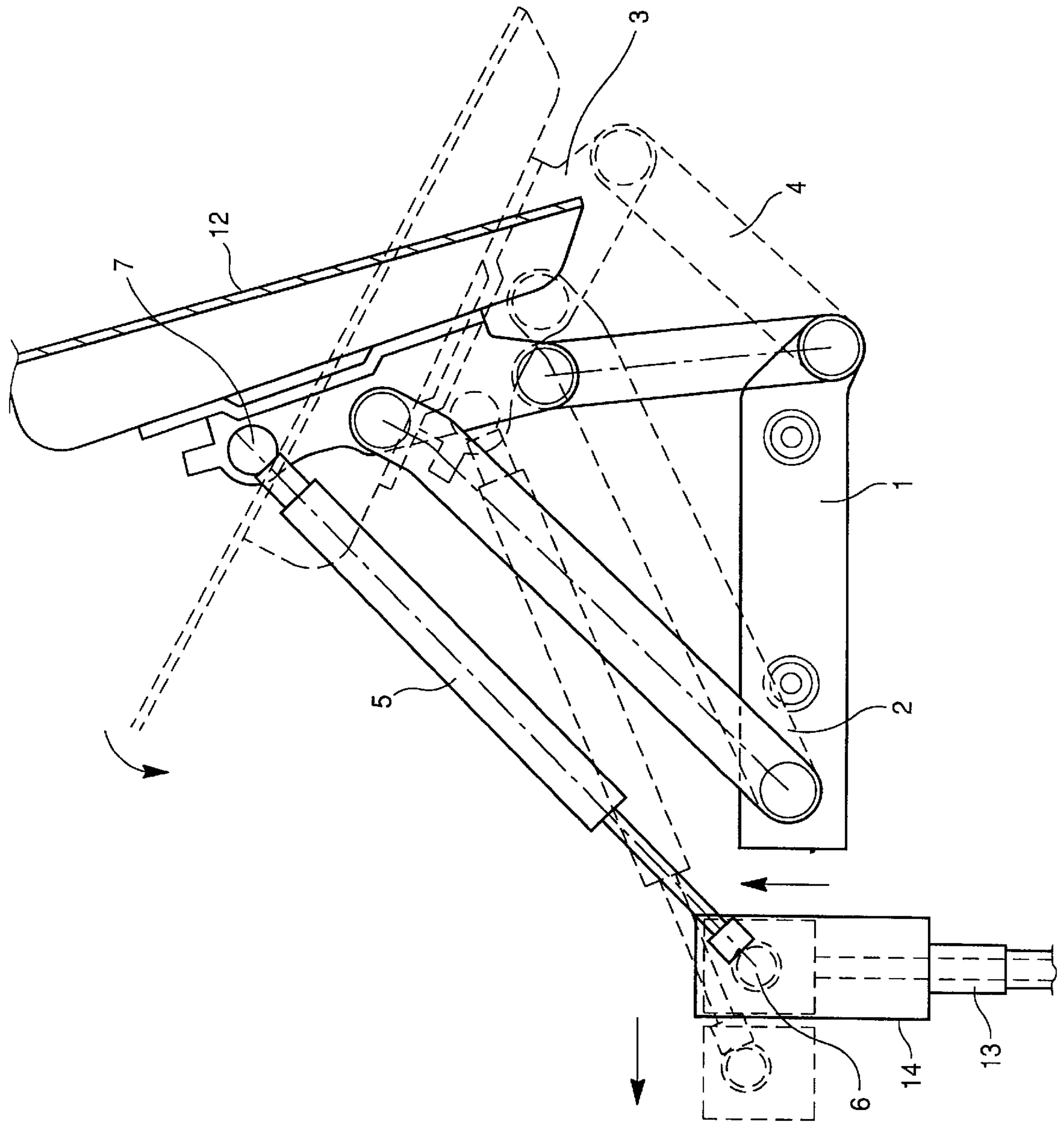
Figure 10:
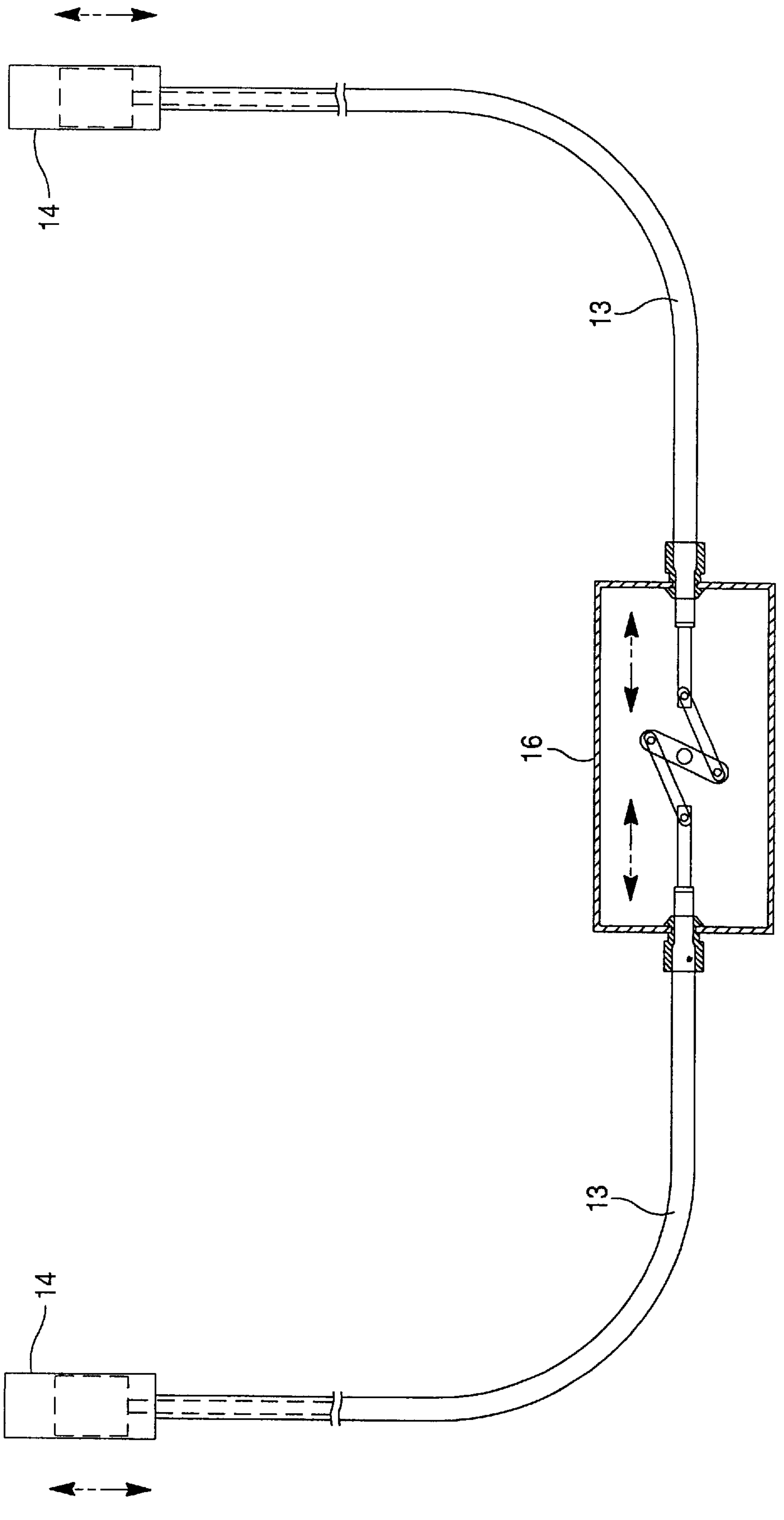
Figure 11:
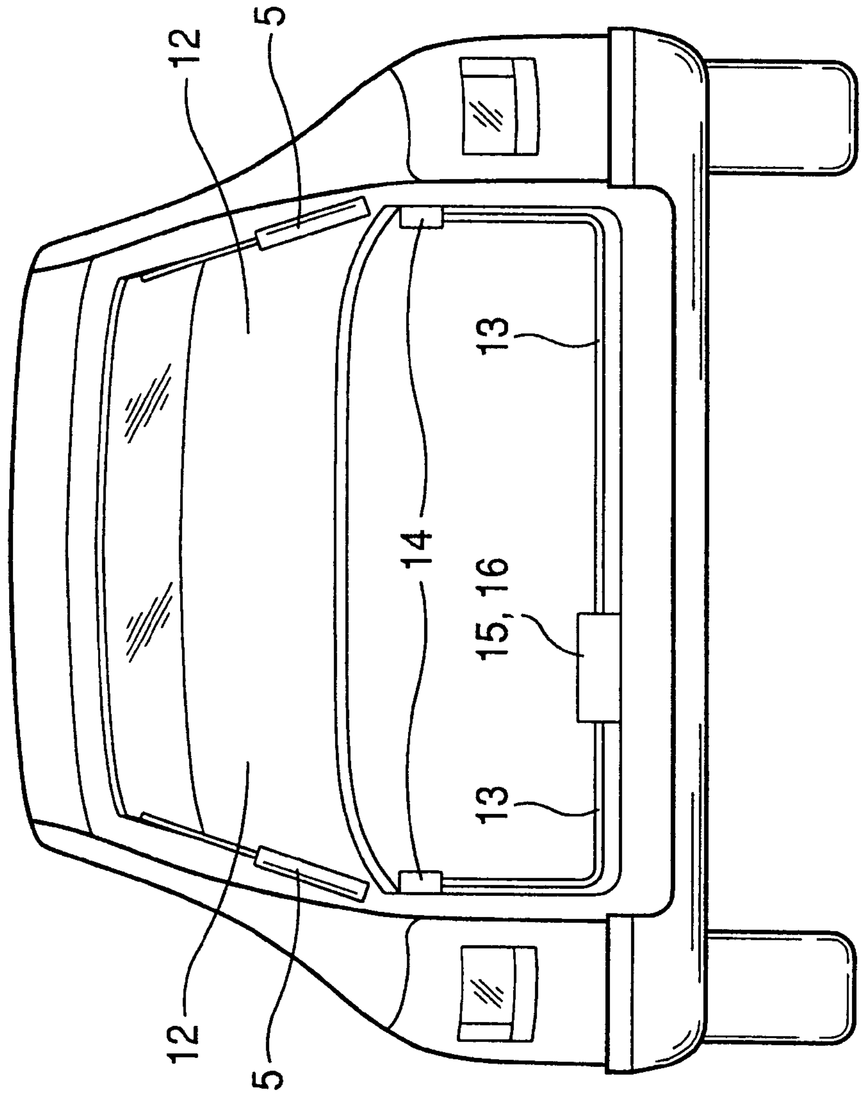

FIG. 1 is an illustrative embodiment of a hatchback drive system of the invention in the closed position, FIG. 2 shows the drive system of FIG. 1 when the connection point of the pneumatic spring is being shifted, FIG. 3 shows the drive system of FIG. 1, the connection point of the pneumatic spring having been moved into the lower end position during the initial hatchback opening process, FIG. 4 shows the drive system of FIG. 1 in a position wherein the pneumatic spring applies full power to open the hatchback, FIG. 5 shows the drive system of FIG. 1 in the open position, FIGS. 6–9 show an illustrative embodiment of a drive shifting the body-side connection points of two pneumatic springs in different operational positions, FIG. 10 is an embodiment of a drive shifting the body-side connection points of two pneumatic springs, and FIG. 11 shows an installation variant of the drive system of the invention in the rear of a vehicle.

The motor-vehicle hatchback hinge shown in FIGS. 1 through 5 comprises an affixation part 1 on which hinges a link 2 of a four-link hinge. The link 2 is affixed at its other end to a base plate 3 which also affixes the trunk door or the engine hood or the hatchback 12. The base plate 3 furthermore is connected in articulating manner by another link 4 of the four-link hinge to the affixation part 1. Together the parts 1, 2, 3 and 4 form the four-link hinge. A power spring, ie a pneumatic spring 5 is located between the affixation part 1 and the base plate 3 and is connected by the ball-joints 6 and 7 to the base plate 3 and the affixation part 1. A push-pull cable 13 is used to drive the shifting mechanism 14 allowing shifting the connection point 6 of the pneumatic spring 5 up and down and back.

As shown by FIG. 1, when the hatchback 12 is in the closed position, the connection points 6 and 7 of the pneumatic spring 5 are located on a straight line running approximately parallel to the hatchback 12 and as a result no force component in the open direction acts on the hatchback 12.

To make the hatchback 12 self-opening in the manner of the invention, the orientation of the pneumatic spring 5 is changed in such manner that one force component shall act in the direction of opening. This feature is attained in the presently selected illustrative embodiment in that the connection point 6 of the pneumatic spring 5 initially is lowered by a drive further discussed below in the manner indicated by the arrow shown in FIG. 2. It is assumes in this respect that when the connection point 6 is lowered as shown in FIG. 2, the force exerted by the pneumatic spring 5 is inadequate on account of its angular position relative to the hatchback or to the four-link hinge, to cause opening the hatchback.

In FIG. 3 the connection point 6 has been lowered so much that the angular position of the pneumatic spring 5 relative to the four-link hinge or to the hatchback 12 is adequate to overcome the system deadpoint and to initiate opening thee hatchback 12. The pneumatic spring 5 therefore will relax and thereby the hatchback 12 will open in the direction of the curving arrow.

In order to fully use the maximum force produced by the power spring, ie the pneumatic spring 5, the connection point 6 will next be motor-raised again from its lowered position as indicated in FIG. 3 to an intermediate position as shown in FIG. 4 and into an end position as shown in FIG. 5. The connection point 6 is again in its topmost position that it assumes in FIG. 1. Thereby the spring 5 is able to apply its full force to open and keep open the hatchback 12.

It may be enough in some circumstances to leave the connection point 6 of the power spring, ie the pneumatic spring 5 in the lowered position shown in FIG. 3 in order to achieve full hatchback opening. However to take care of weather conditions, inclined vehicle positions, snow loads, wear and the like, preferably the lowering of the connection point 6 shall be followed by a lifting it again as shown in FIGS. 4 and 5.

FIG. 5 moreover shows the feasibility of the invention to initiate self-closing by the hatchback 12. Such self-closing for instance may be implemented by relaxing the power spring, ie the pneumatic spring 5 by horizontally shifting the connection point 6 (in FIG. 5, to the left and in the vehicle to the rear, as shown in dashed lines), whereby the pneumatic spring 5 will subtend a more acute angle relative to the hatchback 12. This escaping motion obviously may also be carried out in a direction other than that shown. Because of the weight of the hatchback 12, the shown leftward shifting of the connection point 6 (straight arrow) is followed by a closing motion (curved arrow), the closed position of the body-side connection point 6 allowing to return it into its position of FIG. 1 without danger of reopening because no force component will act in this position in the direction of opening the closed hatchback 12; the hatchback 12 will not be opened, instead only the pneumatic spring 5 is restressed.

The raising and lowering of the connection point 6 illustratively can be implemented by a an adjusting system as shown in FIG. 10 in order that the connection points of the pneumatic springs 5 on each side of the hatchback 12 be equally adjusted by a single motor drive. FIG. 11 shows an illustrative variation of installation.

The adjusting system of FIG. 10 shows the two shifting mechanisms 14 for the two connection points 6 of the pneumatic springs 5. They are synchronously adjusted by the two push-pull cables 13. The adjustment is carried out using a setting unit 15 in a housing 16. The white arrows in FIG. 10 show the upward adjusting motion of the shifting mechanisms and the black arrows show the downward adjusting motion.

Figures 6, 7, 8, 9:
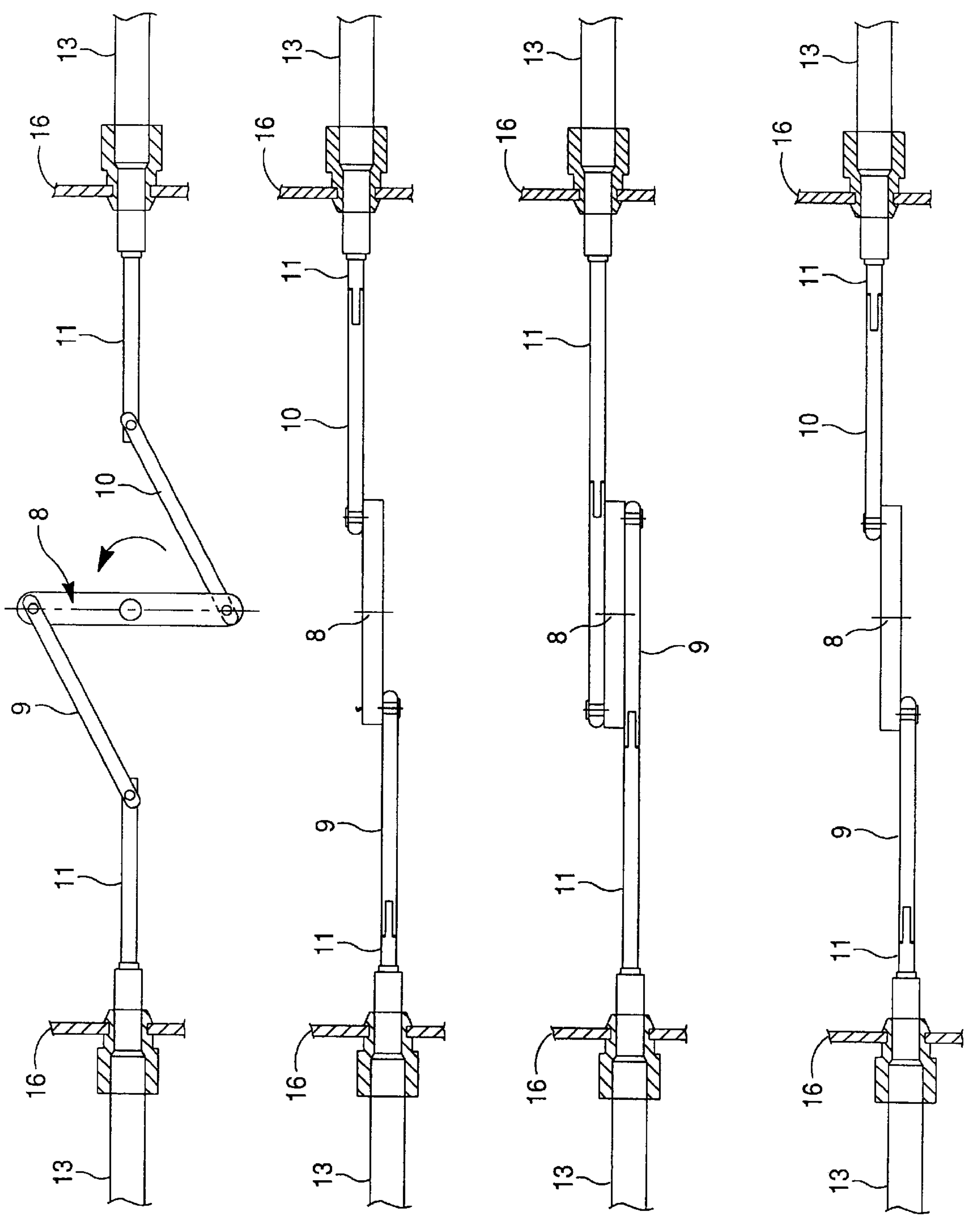

The operation of the setting unit 15 is discussed more comprehensively in relation to FIGS. 6 through 9. The setting unit 15 (parts of housing 16 are shown) comprises a cam 8 which can be set into rotation as shown by the arrow of FIG. 6 by a motor and which in this selected embodiment is a lever linkage. The lever arms 9 and 10 are connected to the ends of the cam 8 and to the associated push-pull bars 11 of mechanical push-pull cables 13. The push-pull cables 13 lead to the associated shifting mechanisms 14 for the connection points 6 of the pneumatic springs 5. These shifting mechanisms 14 are shown only in illustrative manner in the Figures and for instance may be guides guiding a slide connected to the particular push-pull cable, this slide bearing the connection point 6, ie the ball-pin for the body-side affixation of the pneumatic spring 5. The setting unit denoted overall by 15 is mounted inside the housing 16 which also receives the omitted drive motor.

Again it is feasible though not shown to replace the cam 8 with an excentric disk set into rotation by an adjusting motor. One or two such excentric disks also may be directly connected to the connecting points 6. In such a design the push-pull cables can be eliminated.

FIG. 6 shows a position of cam 8 which corresponds to an intermediate position of the body-side connection point 6 as shown in FIGS. 2 and 4.

In FIGS. 7 and 9 the cam 8 exerts a maximum excursion on the shifting mechanism 14, ie on the body-side connection point 6 in its upper end position as shown in FIGS. 1 and 5.

FIG. 8 shows the position of the cam 8 corresponding to the lower position of the connection point 6 in the shifting mechanism 14 of FIG. 3.

FIG. 11 shows a configuration of a drive-system of the invention. It comprises the pneumatic springs 5 keeping the hatchback 12 open. The drive system of the invention in this case consists of the setting unit 15 in the housing 16 and so driving the two adjusting mechanisms 14 by means of the push-pull cables 13 that the connection points 6 of the pneumatic springs 5 change their body-side positions.

I claim:

1. A drive system for a hinged door, comprising:

at least one hinge (1, 2, 3, 4) connecting the hinged door to a relatively fixed body;

a power spring assisting at least one of an opening and closing motion of the hinged door; and a mechanism adjusting the power spring's direction of action wherein the power-spring adjustment takes place when opening a hatchback (12), said system further including;

a mechanism shifting the power spring's connection point.

2. Drive system as claimed in claim 1, wherein the power spring's connection point (6) is shifted in such manner that a force component in an "open" direction is present in the closed state.

3. Drive system as claimed in claim 1, wherein an adjustment sub-assembly uses an adjusting mechanism (14) implementing at least one of an up-and-down motion and a horizontal displacement of the power spring's connection point.

4. Drive system as claimed in claim 1, further comprising a cam (8) shifting the direction of action.

5. Drive system as claimed in claim 1, wherein after opening, the connection point of the power spring is returned to an initial position.

6. Drive system as claimed in claim 1, further comprising a mechanism shifting the connection point of the power spring when the hinged door (12) is open in such manner that the hinged door (12) shall be self-closing.

7. A drive system for a hinged door, comprising:

at least one hinge connecting the hinged door to a relatively fixed body thereby permitting said hinged door to pivot along an arcuate direction of travel;

a power spring assisting a motion of the hinged door by directing a force along a first direction; and an adjusting mechanism adjusting the position of the power spring relative to the hinge;

wherein the adjusting mechanism adjusts said position of said power-spring during an opening motion of the hinged door, said system further including;

a mechanism shifting the location of the connection point of the power spring after the hinged door is open in such manner that the hinged door becomes self-closing.

8. The drive system as claimed in claim 7, wherein the first direction is adjusted to direct said force toward a tangent of said direction of travel during an opening motion.

9. The drive system as claimed in claim 7, wherein said adjusting mechanism adjusts a location of a connection point of the power spring.

10. The drive system as claimed in claim 9, further comprising an adjustment sub-assembly that moves said location of said connection point in at least one of a vertical and horizontal direction.

11. The drive system as claimed in claim 9, further comprising a cam that reciprocatingly moves said location of said connection point.

12. The drive system as claimed in claim 9, wherein, after opening, said location of said connection point of the power spring is returned to an initial location.

13. The drive system as claimed in claim 7, wherein the first direction is adjusted to direct said force away from a tangent of said direction of travel during a closing motion.

* * * * *